Dec. 17, 1940.   T. W. KREEGER   2,225,307
CONVERTIBLE PICTURE
Filed April 25, 1938

Thomas W. Kreeger,
INVENTOR.
BY
HIS ATTORNEY.

Patented Dec. 17, 1940

2,225,307

UNITED STATES PATENT OFFICE 2,225,307

CONVERTIBLE PICTURE

Thomas W. Kreeger, Los Angeles, Calif.

Application April 25, 1938, Serial No. 204,181

1 Claim. (Cl. 41—20)

This invention relates to illustrating and displaying objects to appear differently under different conditions, such as normal light on the one hand, and darkness, or dim light, on the other hand.

One of the objects of this invention is to create a transformation by means of luminescent applications, to result in a showing, or appearance, of one form under one condition, to change into a different showing under another condition in the surroundings.

Another object is to create a transformation by means of overlapping and otherwise harmonizing hues that will appear differently under different light influences.

Another object is to create one object in one hue of a type that will be visible under a certain light effect, and another object in another hue that will be visible under a different light effect appearing in the same place as the first object.

Another object is to create one matter on one side of an eventually transparent, or translucent, material, and another matter on the opposite side of the same material, to appear, or be visible by different, or suitable light effects.

Other objects will appear from the following description and appended claim as well as from the accompanying drawing, in which—

Though the application, or use, of luminescent, or phosphorescent, bodies, or matter, may be said to be known, this invention concerns itself with steps that go beyond such known practices.

New features, in this present case, involve combinations, applications, and arrangements that serve to produce artistic and practical results for the enhancement of the intimate home as well as any public place.

Of course, it is not limited to any particular structure of any material size, but may be used for, and applied to, any object or article.

The subject involved may range from any landscape, marine, or nature scenes to any individual objects, such as animals, minerals, or vegetation.

One of the principal features may, nevertheless, be said to involve a transformation of whatever is shown, under different, or varying, light influences.

So, a normally appearing summer scene may under a changed light influence appear as a winter scene; or, a day-scene may under a changed light effect appear as a night-scene, or dimmed, or even rather ghostly; and, while normally there may appear a certain type of animal, or object, under a changed light effect an entirely different animal or object may be seen; though, of course, such a change would be produced easier with objects that have similar contours. However, it is possible to interweave objects of normally very much different contours, as will be more fully set forth hereafter, so as to be readily understood.

Such radical changes would preferably be made with harmonizing, or not too much contrasting hues.

With transparent, or translucent materials, nevertheless, quite different hues may be combined by having the contrasting figures on opposite sides of the materials, the differing figures to be visible as light effects are applied to one side or the other, thereby bringing out quite contrasting hues through the transparent, or translucent, materials.

So, for instance, a light-coated panther may be shown on one side of the transparent material, when light is only applied to this side, or as normally seen; while, when light is applied from the other side, the darker spots of a leopard may so well intermingle with the showing normally seen as to give the impression that a different picture has been produced, though the darker spots were, in fact, always on the back side of the material only to appear through the transparent, or translucent, material when the light is so applied.

Adding luminescent touches to certain parts of the showing on the front side, still further changes may be observed on elimination of bright light effects.

Figure 2:
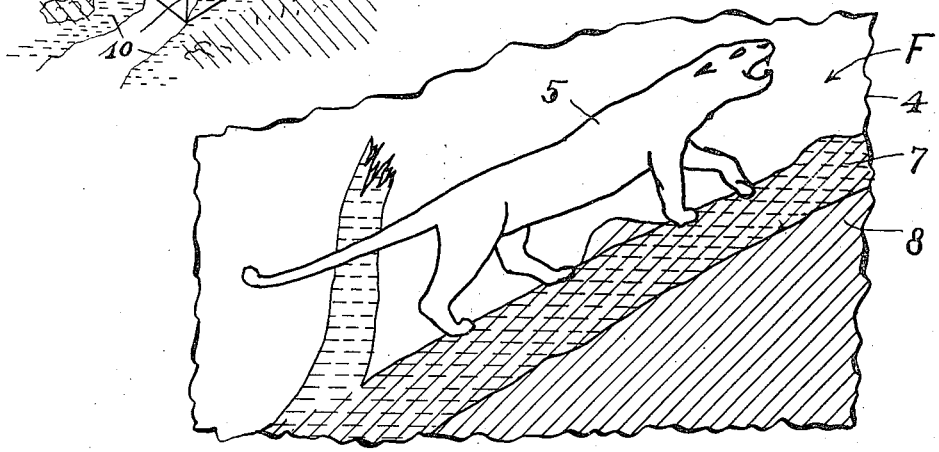
Fig. 2 is a plan view of a piece of material with the outline of an animal and other matter thereon, to illustrate the application of different hues, to give interchangeable results according to this application.
Figure 3:
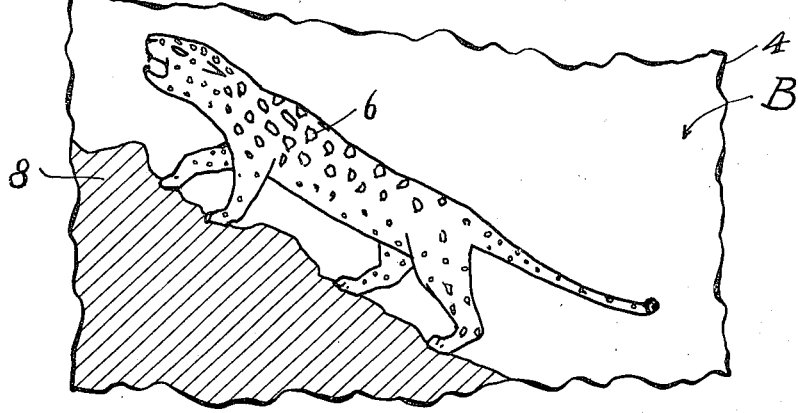
Fig. 3 is the rear side of the same piece of material with the contours of an animal eventually to match, and to align with, the contours of the animal in Fig. 2, as seen when looking through the material against light.

In Figs. 2 and 3, for instance, this has been illustrated, showing a lightly-colored panther at 5 on the front face F of the sheet 4 in Fig. 2; while showing a spotted leopard at 6 on the back face B of the same sheet 4; besides having luminescent material applied in form of a tree limb at 7, To the illustration on the front F there may easily be added some green showing in form of grass, or other objects, such as rocks, to give the impression of the panther resting on a hill side; while this same illustration, when not under light effects, may give the impression of the same panther being on a limb, in darkness the other objects not appearing as clearly as the luminescent tree-limb.

On the other hand, when bright light is applied to the back-side B, with the sheet 4 of sufficient transparency, the spotted leopard, illustrated on the back B, may be seen from the front, as resting on the same hillside, on rocks, or among grass, as the case may be; the luminous effects being not at all, or less, effective, from, either, the front, or the rear, under the brighter light influences.

Figure 1:
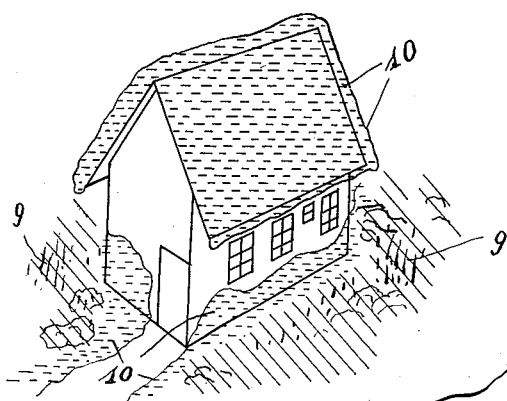
Fig. 1 is a small sketch of a house with suitable surroundings, to indicate the interchangeability and convertability into summer and winter scenes in accordance with this invention.

Fig. 1 shows a house roughly outlined, which may be illustrated with green shrubs, grass, etc., to give a summer effect, 9 to designate such growth.

Applying to this same illustration, furthermore, luminescent material in form of snow banks, or coverings 10, this easily changes the pictures into a winter-scene upon withdrawal of this illustration from bright light effects.

Any luminescent showing can easily be made so as not to interfere materially with the normal picture intended for day light or any sort of bright light influences.

The luminescent showing can also be given various hues and colors, not so easily demonstrated in black-line official drawings, such as patent drawings are normally required to be.

Several sketches have therefore been included in this application, to be made a part of the record in this case, the sketches being made of lightly colored form more suitably demonstrating this invention, the sketches being marked "C," "D," "E," and "F."

Having referred to sheets, it should be understood that any suitable material can be used on which to produce such illustrations, even glass, or Celluloid, plain, or colored, may be used, and, of course, of any desired, or required shape and form in the outer contours, such as round, or square.

Such sheets, or materials, may be of any desired or required form, to be hung on a wall as a picture, or to be used for different purposes, as, for instance, lamp-shades.

The background can also be of any desired or required type.

In the sketch "C," for instance, the background is black, with only parts of a head produced in touches of white.

This particular sketch "C" is giving a high light effect. It is furthermore provided with a luminescent touch over these white spots, to intensify the high light effect, when this sketch is held in other than bright light. In dim light, this changes to one type of hue; and in total darkness it changes to an even more intense light as from above.

Sketch "D" changes the picture to a profile silhouette in the darkness with intensified silhouette effect by means of a surrounding luminescent application, that has even a changed hue, when held in the dark.

Sketch "E" shows our Saviour in a countryside with the tomb in the background when seen under normal light influences; while changing from this Resurrection showing to a showing of the Crucifixion when held in the dark after having subjected the original showing to brighter light influences for a suitable short time, the hues being so harmonious as not to materially interfere with the different showings.

Sketch "F" shows, perhaps, a little better what has already been described before with reference to the line drawing, a panther being shown on the front of the sheet and a leopard on the back, with the tree limb and the eyes in luminescent material.

From the foregoing it should be understood that the interchangeability and convertability can be used for many different purposes and on many different objects, not only for the sake of novelty, but, rather for greater effectiveness of calling attention to certain features.

Even with art-exhibitions, undoubtedly, points can be emphasized without changing the art-object, by merely having certain shade effects applied to the rear, or having very light transparent material placed in front of the art-object, with harmonious luminescent touches on the transparent material, which can make the art-object more effective by intensifying certain of its points, in conjunction with changes in the light effects.

Of course, individual small pieces may be applied to individual parts of any picture, and, while, with an art-object no direct pasting or gluing is desirable, with any household object, such as a lamp-shade, individual pieces may be directly pasted, or otherwise applied to individual parts of any showing.

An existing article may thereby be given an entirely new effect with very little costs.

Having thus described my invention, I claim:

An interchangeable combination picture having certain definitely visible illustrations and other normally not visible illustrations, a part of the illustrations being on one side and of a color visible by reflected light, another part of the illustrations being on the opposite side and of a color visible by transmitted light supplementary to and so as to change the appearance of the first-named part, and a third part being on the first-named side and of a material visible in the dark after having first been subjected to reflected light and being so applied as to supplement and define portions of the first and second-named parts in the dark, said material being of a substance characteristically safe against explosion and poisoning and effective as to luminescence under common day-light and artificial light.

THOMAS W. KREEGER.